(12) United States Patent
Maunder et al.

(10) Patent No.: US 6,176,276 B1
(45) Date of Patent: Jan. 23, 2001

(54) GRANULAR MATERIAL FEEDING DEVICE

(75) Inventors: Andrew Maunder, Guildford (GB); Thierry Destoop, Bondues (FR)

(73) Assignees: NEU Engineering Limited; NEU Transfair, both of Marcq en Baroeul (FR)

( * ) Notice: Under 35 U.S.C. 154(b), the term of this patent shall be extended for 0 days.

(21) Appl. No.: 09/305,880

(22) Filed: May 5, 1999

(30) Foreign Application Priority Data

May 5, 1998 (GB) .................................................. 9809478

(51) Int. Cl.⁷ ...................................................... B65B 1/04

(52) U.S. Cl. ............................ 141/67; 141/286; 239/654

(58) Field of Search ................................ 141/67, 286, 18; 239/654, 518, 524

(56) References Cited

U.S. PATENT DOCUMENTS

| | | | |
|---|---|---|---|
| 5,660,215 | * | 8/1997 | Krambrock et al. .................. 141/286 |
| 5,746,258 | * | 5/1998 | Huck ...................................... 141/67 |
| 5,873,393 | * | 2/1999 | Kordt ...................................... 141/67 |

* cited by examiner

Primary Examiner—Steven O. Douglas
(74) Attorney, Agent, or Firm—Akin Gump Strauss Hauer & Feld

(57) ABSTRACT

A device for feeding a granular material from an upstream source to a downstream location such as a mobile container. The device comprising a conduit for receiving a flow of said granular material and which has an outlet for delivering granular material to said location. Then device further comprises a delivery system for delivering a stream of gas to the conduit to entrain and accelerate at least a portion of the granular material flowing therethrough, and an apparatus for directing the gas stream so that granular material is propelled from the outlet in a plurality of directions.

20 Claims, 2 Drawing Sheets

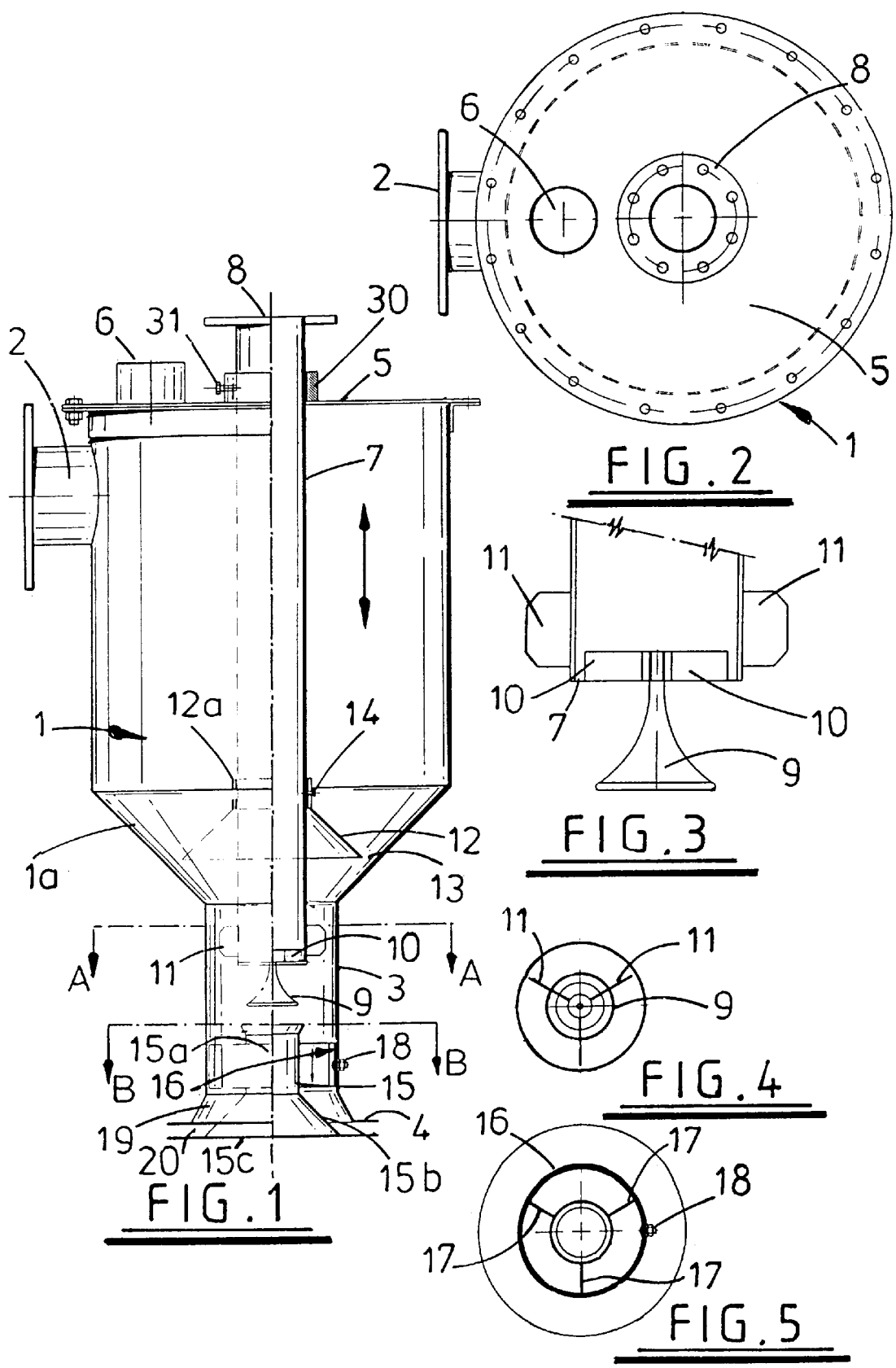

GRANULAR MATERIAL FEEDING DEVICE

CROSS REFERENCE TO RELATED APPLICATIONS

This Application claims priority under 35 U.S.C. § 119 to British Patent Application No. 9809478.2 filed May 5, 1998.

BACKGROUND OF THE INVENTION

A. Field of the Invention

The present invention relates to a feeding device for delivering granular material or the like. Particularly, but not exclusively, the invention relates to a device for feeding granular material into a container. More particularly still, the invention in one embodiment provides a device for top entry feeding of granular material such as polymer beads, into containers such as rail cars.

B. Description of the Related Art

It is conventional to transfer granular materials from the end of a process or production line into mobile containers, such as railcars, for transport. Currently transfer of the granular material to the container is essentially a two stage process in which the material is first conveyed to large elevated storage silos using pneumatic pipe lines. Such silos typically have massive steel support structures which must be capable of withstanding extreme weather conditions and even earthquakes. From the silos, the material may then be discharged under gravity to fill mobile containers positioned below. Typically, the material may exit the silo via a delivery system comprising two delivery tubes (forming in appearance an inverted V shape) to deliver material to opposite ends of a trailer in an attempt to maximize filling.

A disadvantage of the conventional systems mentioned above is the relatively high construction cost associated with the provision of multiple large elevated silos. In addition, such systems have limited filling efficiency.

It is an object of the present invention to obviate or mitigate the above disadvantages.

SUMMARY OF THE INVENTION

According to the present invention there is provided a device for feeding a granular material from an upstream source to a downstream location, the device comprising a conduit for receiving a flow of said granular material the conduit having an outlet for delivering said granular material to said location, means for delivering a stream of gas to the conduit to entrain and accelerate at least a portion of the granular material flowing therethrough, and means for directing the gas stream so that granular material is propelled from the outlet in a plurality of directions.

With the device according to the present invention there is no need to provide large expensive storage silos since material can be continuously fed from a supply line, such as a conventional pneumatic supply line, to a container, or succession of containers. Moreover, because the material is projected from the device in a plurality of directions, container filling efficiency is improved. An embodiment of the present invention may be used to fill a container with a filling efficiency of greater than 96% of the volumetric capacity of the container.

With referred embodiments of the invention material is delivered to the device in a dense phase (e.g. plug flow) at a low velocity (typically less than 8 ms$^{-1}$) which minimizes damage to the material. The material is however distributed by the device in a lean phase, evenly mixed with the gas stream.

BRIEF DESCRIPTION OF THE DRAWINGS

A specific embodiment of the present invention will now be described, by way of example only, with reference to the accompanying drawings, in which:

FIG. 1 is a half sectioned side elevation of a feeding device according to the present invention;

FIG. 2 is a plan view from above of the feeding device of FIG. 1;

FIG. 3 is an expanded view of a detail of the feeding device of FIG. 1;

FIG. 4 is a cross sectional view of the device of FIG. 1 taken on the line A—A;

FIG. 5 is a cross sectional view of the device of FIG. 1 taken on the line B—B.

DETAILED DESCRIPTION OF INVENTION

Figure 6:
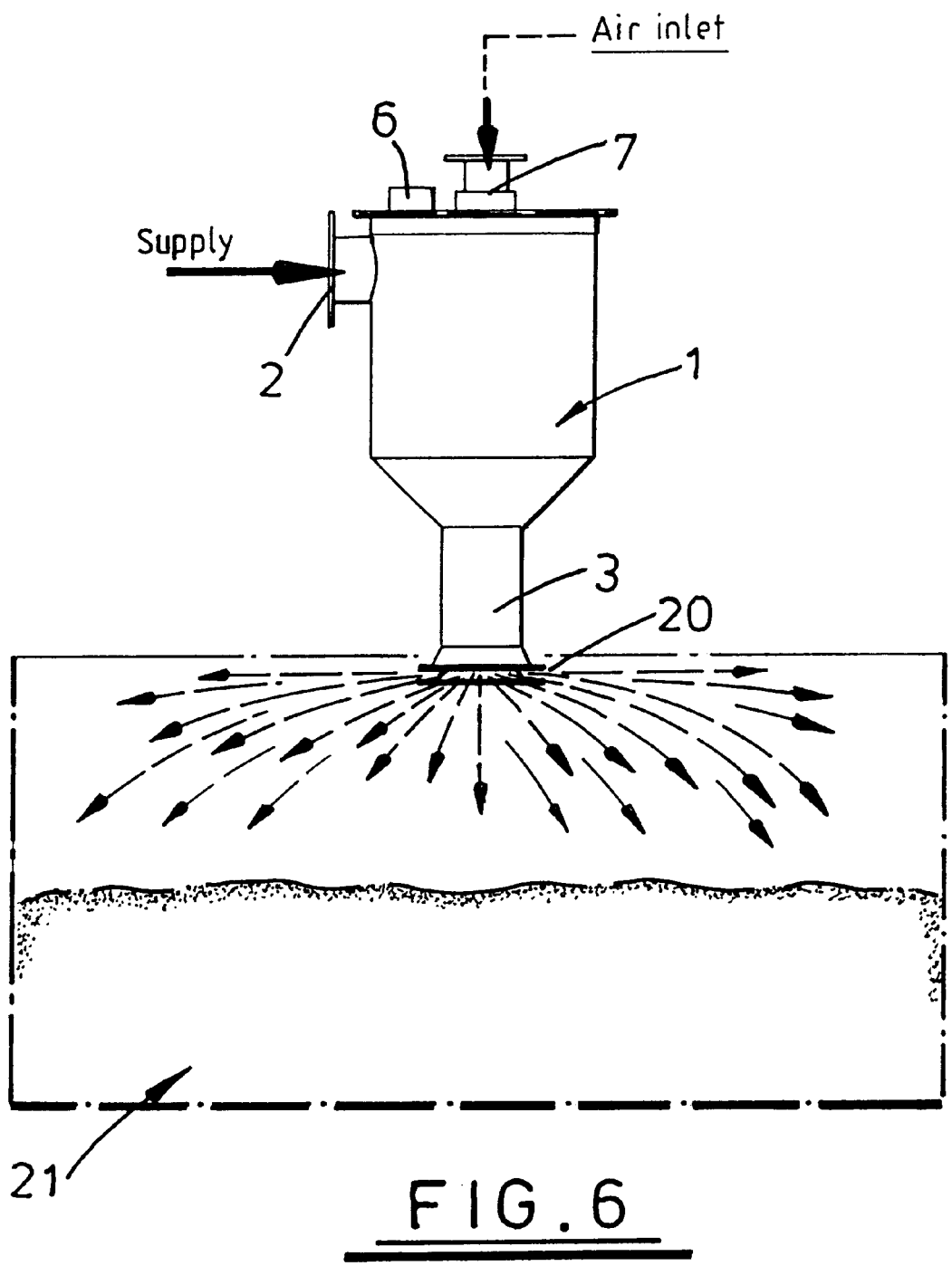
FIG. 6 is a schematic drawing illustrating operation of the device of FIG. 1.

The particular embodiment of the invention illustrated in the drawings is a device designed for top entry feeding of polymer beads into containers such rail cars. Referring to the drawings, and particularly FIG. 1, the device comprises a hopper 1 which receives the polymer beads via a flanged inlet 2. At its lower end, the hopper 1 has downwardly tapered section 1a which tapers inwardly to a delivery chute 3 which has a flared lower end terminating in a radial flange 4. The top of the hopper 1 is closed by a cover plate 5 which is fitted with a filtered air vent 6. The top end of an air pipe 7 (which extends axially along the hopper 1) protrudes through a collar 30 at the center of the cover plate 5 and terminates in a flanged air inlet 8. The axial position of the air pipe 7 is maintained (and is adjustable) by a bolt 31 which extends through the collar 30.

The air pipe 7 extends along the axis of the hopper 1 and a short distance into the delivery chute 3, the lower end of the air pipe 7 being centralized within the delivery chute 3 by spacers 11. A generally conical deflector 9 is fitted within the bottom opening of the air tube 7 by way of radial mounting members 10. A frusto-conical member 12 is fitted around the air tube 7 in the tapering portion 1a of the hopper 1. The frusto-conical member 12 tapers outwardly towards the walls of the hopper 1 so that an annulus 13 is defined between the member 12 and the narrowing wall of the hopper portion 1a. The member 12 is fixed to the air pipe 1 by way of a collar portion 12a which receives a bolt 14 which can be tightened onto the air pipe 7. This arrangement allows adjustment of the axial position of the member 12 to adjust the width of the annulus 13.

An insert outlet member 15 is mounted within the opening of the delivery chute 3. The insert member 15 is hollow and comprises a generally cylindrical portion 15a and an outwardly and downwardly flared lower deflector portion 15b which terminates with a radial flange 15c. A radial outlet 20 is defined between the flange 4 of chute 3 and the flange 15c. The insert member is supported by a collar 16 which is slidably mounted within the delivery tube 3, and members 17 which extend between the portion 15a of the insert member 15 and the collar 16. The collar 16 is secured in position by a nut and bolt arrangement 18 which allows for the position of the collar, and thus the position of the insert member 15, to be axially adjusted within the delivery tube 3.

The inter-relation and function of the various components of the device will now be explained by the following description of the operation of the device.

The device is designed to receive polymer beads delivered from a pneumatic conveyor (not illustrated) to the inlet 2. The device is particularly adapted to receive the polymer beads at a relatively low velocity (typically 4 to 8 meters per second), which is carefully controlled (in accordance with known techniques) to provide plug phase flow. That is, polymer beads are metered into the pneumatic supply line at a carefully controlled rate to ensure formation of discontinuous "plugs" of material which are effectively interspersed with "cylinders" of compressed air. This is a known form of supply system which has been used to deliver granular material from production lines to conventional storage silos. The system is advantageous in that it minimizes damage to the material. However, the flow rate is insufficiently high to fill, for instance, conventional railway cars in an efficient manner. The device of the present invention provides additional propulsion to increase the feed velocity of at least some of the polymer beads and effect a high container filling efficiency.

The air/polymer beads delivered to the hopper 1 will establish a cyclonic motion within the hopper 1 around the central air tube 7. This serves to separate the polymer beads from the air; the relatively heavy beads will fall within the hopper 1 whereas the supplying air is exhausted via the filtered air vent 6. Material within the hopper 1 will fall through the annulus 13, defined within the tapered portion 1a of the hopper 1 by the frusto-conical member 12 and into the delivery chute 3 (passing between the spacers 11).

A jet of compressed air is supplied to the delivery chute 3 via air pipe 7 (from a centrifugal fan or roots type blower or similar source positioned at the air pipe inlet 8). The air stream from the air pipe 7 is deflected radically by the conical deflector 9 which functions to produce a generally annular air flow towards the outlet of the delivery tube 3 which will entrain the polymer beads which fall through the annulus 13. Thus, the majority of the polymer beads flowing through the delivery chute 3 will be entrained and accelerated by the air flow from the air pipe 7 and conveyed through the annular gap 19 to the radial outlet 20. Whilst most of the polymer beads will be conveyed in this way to the radial outlet 20, turbulence in the region of the deflector 9 (i.e. the point at which the air stream from air pipe 7 mixes with the polymer beads) will cause some of the beads to fall under gravity through the insert 15 and vertically out from the portion 15b.

The overall effect of the device, which is schematically illustrated in FIG. 6, is to deliver the majority of the polymer beads in a generally radial direction (firing the beads towards the walls of a container 21 through a 360° angle) whereas a smaller portion of the beads will be gravity fed in a vertical direction. The effect is to provide a distribution of the polymer beads which results in very efficient filling of the container 21.

The device is specifically designed to allow adjustment of various components to adapt the device for feeding a variety of different materials, having different bulk densities and granule sizes, and at different rates. That is:

i) The position of the frusto-conical member 12 on the air pipe 7 may be adjusted (by releasing the bolt 14 and sliding the collar 12a along the pipe 7) to vary the width of the annulus 13 through which the granular material is metered into the air stream from the air pipe 7.

ii) The axial position of the insert 12 within the delivery chute 3 can be adjusted (by releasing the nut and bolt arrangement 18 and sliding the collar 16 along the tube 3) to adjust the width of the annulus 19 and the cross-sectional area of the radial discharge outlet 20.

iii) The collar and bolt arrangement 30 and 31 allows for adjustment of the position of the central air pipe 7 to vary the axial distance between the deflector 9 and the insert 15.

It is envisaged that in most applications the width of the annulus 13 will be adjusted within the range 5 to 50 mm, the axial separation of the deflector 9 from the top of the cylindrical portion 15a of insert 15 will be adjusted between 20 and 100 mm, and the cross-section dimension of the radial discharge annulus will be adjusted to a width of between 10 and 100 mm. By carefully setting up the device for a particular material it has been found possible to fill mobile containers such as railcars to a level in excess of 96% of their volumetric capacity.

It will be appreciated that the device described above is not limited in its application to feeding polymer beads. The device could be utilized to feed any other material of an essentially particulate or powdered nature which can be entrained within an air stream. Neither is it necessary to deliver the material to the device in a plug phase flow. It will be readily apparent to the appropriately skilled person that many modifications can be made to the detail of the embodiment described above which is provided as an example only.

What is claimed is:

1. A device for feeding a granular material from an upstream source to a downstream location, the device comprising:

a conduit for receiving a flow of the granular material, said conduit having an outlet or delivering the granular material to the downstream location;

a pipe, having an open end, which extends into said conduit for delivering a stream of gas to said conduit to entrain and accelerate at least a portion of the granular material flowing through the conduit downstream of said open end of said pipe; and a generally conical first deflecting member positioned in the stream of gas between said open end of said pipe and said outlet to direct the gas stream so that the granular material is propelled from said outlet in a plurality of directions.

2. The device according to claim 1, wherein said conduit is a chute arranged substantially vertically.

3. The device according to claim 1, wherein said outlet has a generally annular portion.

4. The device according to claim 3, wherein said generally conical first deflecting member is located proximate to said open end of said pipe to deflect the stream of gas into a substantially annular flow towards said annular portion of said outlet.

5. The device according to claim 4, wherein a second deflecting member is mounted within an end of said conduit downstream of said first deflecting member.

6. The device according to claim 5, wherein said second deflecting member is hollow having an inlet opening facing said first deflecting member and an outlet opening defining a portion of said outlet of said conduit, said second deflecting member thereby providing a channel through which granular material not entrained in the stream of gas may be gravity fed to said outlet.

7. The device according to claim 5, wherein the position of said first deflecting member is adjustable to vary the distance between said first and second deflecting members.

8. The device according to claim 7, wherein said pipe is adjustable to adjust said position of said first deflecting member relative to said second deflecting member.

9. The device according to claim 3, wherein said annular portion of said outlet is adjustable.

10. The device according to claim 3, wherein said annular portion of said outlet is adjustable by adjusting a second deflecting member within said conduit.

11. The device according to claim 1, wherein said pipe is coaxially supported within said conduit.

12. The device according to claim 1 further comprising a chamber for receiving the granular material from the upstream source via an inlet and delivering it to said conduit via an outlet.

13. The device according to claim 12, wherein said outlet of said chamber is annular.

14. The device according to claim 13, wherein said outlet includes an adjustable member located within said chamber for varying the size of said outlet.

15. The device according to claim 14, wherein a gas supply pipe extends through said chamber and said adjustable member is mounted to said pipe.

16. The device according to claim 15, wherein said adjustable member is located in a tapered or conical portion of said chamber whereby the size of said annular outlet is adjusted by adjusting an axial position of said member on said pipe.

17. The device according to claim 15, wherein said adjustable member is generally frustoconical and mounted coaxially about said pipe.

18. The device according to claim 12, wherein said chamber is adapted to receive granular material from a pneumatic conveyor and said chamber and inlet are adapted to produce a cyclonic flow within said chamber such that the granular material is separated out from the air with which it is supplied.

19. A device for feeding a granular material to a rail car, the device comprising:

a conduit for receiving a flow of the granular material, said conduit having an outlet or delivering the granular material to the downstream location;

a pipe, having an open end, which extends into said conduit for delivering a stream of gas to said conduit to entrain and accelerate at least a portion of the granular material flowing through said conduit downstream of said open end of said pipe; and means for directing the stream of gas so that the granular material is propelled from said outlet in a plurality of directions.

20. A device for feeding a granular material from an upstream source to a downstream location, the device comprising:

a conduit for receiving a flow of the granular material, said conduit having an outlet for delivering the granular material to the downstream location;

means for delivering a stream of gas to said conduit to entrain and accelerate at least a portion of the granular material flowing therethrough;

a hollow deflecting member for deflecting said flow into said plurality of directions, said hollow deflecting member having an inlet opening facing upstream and an outlet opening defining a portion of said outlet of the conduit; and a second deflecting member for providing a channel between said inlet and said outlet of said hollow deflecting member through which granular material not entrained in, and deflected with, the stream of gas can be gravity fed to said outlet of said conduit.

* * * * *